(12) United States Patent
Koster

(10) Patent No.: US 11,683,411 B1
(45) Date of Patent: Jun. 20, 2023

(54) PROCESSING BLOCKED SESSION INITIATION PROTOCOL (SIP) CALLS IN A CONTACT CENTER CALL HANDLER

(71) Applicant: Noble Systems Corporation, Atlanta, GA (US)

(72) Inventor: Karl H. Koster, Sandy Springs, GA (US)

(73) Assignee: Noble Systems Corporation, Atlanta, GA (US)

( * ) Notice: Subject to any disclaimer, the term of this patent is extended or adjusted under 35 U.S.C. 154(b) by 312 days.

(21) Appl. No.: 17/165,537

(22) Filed: Feb. 2, 2021

Related U.S. Application Data

(63) Continuation of application No. 16/811,690, filed on Mar. 6, 2020, now abandoned.

(51) Int. Cl.
| | | |
|---|---|---|
| *H04M 3/00* | (2006.01) | |
| *H04M 5/00* | (2006.01) | |
| *H04L 12/66* | (2006.01) | |
| *H04M 3/42* | (2006.01) | |
| *H04M 3/51* | (2006.01) | |
| *H04L 65/1104* | (2022.01) | |

(52) U.S. Cl.
CPC ..... *H04M 3/42034* (2013.01); *H04L 65/1104* (2022.05); *H04M 3/5158* (2013.01); *H04M 2201/40* (2013.01); *H04M 2203/558* (2013.01)

(58) Field of Classification Search
CPC ............. H04M 3/436; H04M 3/42059; H04M 2203/6045; H04M 2203/6027; H04M 2203/6081; H04M 1/663; H04M 7/0078; H04M 7/123; H04L 65/1104; H04L 65/1069; H04L 65/1079; H04L 65/1016; H04L 65/1101; H04L 65/403; H04L 65/764; H04L 65/1076; H04L 65/1053
USPC ..................... 379/210.02; 370/352, 356, 260
See application file for complete search history.

(56) References Cited

U.S. PATENT DOCUMENTS

| | | | |
|---|---|---|---|
| 8,238,540 B1 * | 8/2012 | Duva ...................... | H04M 3/51 379/265.09 |
| 8,280,022 B1 | 10/2012 | Trinidad et al. | |
| 8,781,105 B1 * | 7/2014 | Duva ...................... | H04M 3/51 379/309 |
| 9,154,614 B1 | 10/2015 | Trinidad | |
| 9,241,070 B1 | 1/2016 | Pycko | |
| 9,398,148 B1 | 7/2016 | Neuer et al. | |
| 9,538,009 B1 * | 1/2017 | Noble, Jr. ............. | H04M 7/129 |

(Continued)

*Primary Examiner* — Kharye Pope
(74) *Attorney, Agent, or Firm* — Blank Rome LLP

(57) ABSTRACT

A call handler is configured to originate calls using records stored in a contact list by using various campaign call data comprising a set of calling party numbers or "ANIs" that are to be used when originating calls. Each ANI is associated with a status, which reflects whether a terminating voice service provider has blocked a prior call using that ANI. The call handler is configured to recognize when a call is blocked by examining SIP protocol-based error codes and/or intercept announcements provided by the carrier when the call is blocked. Upon detecting the call is blocked, the call handler will update the status of that ANI and select another ANI value from the campaign call data to use for subsequent call originations of that campaign. A set of ANIs that a carrier has blocked may be stored to facilitate subsequent redress with that carrier.

20 Claims, 5 Drawing Sheets

(56) References Cited

U.S. PATENT DOCUMENTS

| | | | |
|---|---|---|---|
| 10,205,699 B1 | 2/2019 | Koster | |
| 10,469,661 B1* | 11/2019 | Xuereb | H04M 3/5158 |
| 2008/0285543 A1* | 11/2008 | Qiu | H04L 65/1095 |
| | | | 370/395.2 |
| 2008/0316931 A1* | 12/2008 | Qiu | H04L 41/5067 |
| | | | 370/245 |
| 2010/0041398 A1* | 2/2010 | Sand | H04W 8/20 |
| | | | 455/433 |
| 2013/0045723 A1* | 2/2013 | Sony | H04M 3/42195 |
| | | | 455/414.1 |
| 2014/0314215 A1* | 10/2014 | Duva | H04M 3/4878 |
| | | | 379/265.09 |
| 2015/0213512 A1* | 7/2015 | Spievak | G06Q 30/0275 |
| | | | 705/14.71 |
| 2018/0176876 A1* | 6/2018 | Alam | H04W 60/00 |
| 2018/0343343 A1* | 11/2018 | Filart | H04L 65/1104 |

\* cited by examiner

PROCESSING BLOCKED SESSION INITIATION PROTOCOL (SIP) CALLS IN A CONTACT CENTER CALL HANDLER

RELATED APPLICATIONS

This application is a continuation of U.S. patent application Ser. No. 16/811,690 filed on Mar. 6, 2020, entitled "Processing Blocked Session Initiation Protocol (SIP) Calls In A Contact Center Call Handler," the contents of which is incorporated by reference in its entirety.

BACKGROUND

Voice service providers, including telecommunication carriers, are authorized to block voice calls to their subscribers based on a prediction that the call may be unwanted or a "robocall." The voice service provider may employ various proprietary algorithms for analyzing voice traffic to ascertain whether a call from a particular calling party telephone number would be unwanted or would likely be an illegal telemarketing call. If so, then typically all future calls from that originating calling party telephone number would then be blocked by the voice service provider for a period of time by using the analytics based algorithm. When blocking the call, voice service providers may, in some cases, provide busy call treatment for a blocked call. That is, the caller would hear some form of busy. The caller, however, would be under the impression that a busy condition was actually encountered, when in fact, the call was never even offered to the called party. Thus, this type of "fake" busy is misleading to the caller and the caller might reattempt the call again.

There have been proposals to inform the caller explicitly that the call was blocked. One method is to provide an audio intercept, which is a short audio message designed to inform the caller, who is listening. Such an intercept is readily understandable when heard by a human caller. However, if the call was originated by a computer-based dialer in a contact center, then the audio intercept may not be readily recognized by processing equipment. Hence, the response may include a response code in the signaling protocol that explicitly indicates the call was blocked by the terminating carrier. While some proposals have suggested using an error code (i.e., a type of response code) indicating the called party rejected the call, this would be misleading because that presumes the call is actually offered to the called party. Hence, it would be desirable that both an intercept and error code are provided to the caller, so that regardless of whether the caller is a human or a computer, either type of originator can readily recognize that the call was blocked.

Dialers may be presently configured so that if the call is not answered (or encounters a busy condition) then the number is reattempted at a later time. In this case, if the terminating carrier blocked the call, it may not be productive for the caller to reattempt the call. However, call blocking is a dynamic determination. That is, a call originating with a given calling party number may be blocked by a terminating carrier presently, but in the future, it may be offered, i.e., the calling party number would be unblocked (and vice versa). The exact time and criteria for determining when to block and/or unblock calls from a given calling party number is typically maintained as proprietary information by the carrier or its analytics provider. Thus, it is possible for the terminating carrier to "reset" the status associated with that calling party number (i.e., unblock the number), such that the number's status is changed from blocked to unblocked. At such time, then it may be appropriate to reattempt the call by the caller.

Dialers are not able to accurately determine when a call is being blocked by the terminating service provider, and are not configured to currently properly process such an error code indicate such. Further, mechanisms are not defined whereby the dialer can be configured to recognize the blocking status of a calling party number may change with a particular terminating voice service provider. Therefore, what is needed is a better method for dialers to process a VoIP call where information is provided that indicates the terminating service provider has blocked the call.

BRIEF SUMMARY

Technologies are generally presented herein that variously detect and respond to a VoIP call, specifically a session initiated protocol ("SIP") based VoIP call that is blocked by the terminating voice service provider. The terminating voice service provider may refuse to offer the voice call to its subscriber (the called party) for various reasons. When blocking the call, the terminating voice service provider may connect the call to an announcement server, which plays an audio intercept announcement. After the intercept announcement is completed, the terminating service provider returns a SIP error code indicating the call is blocked. In various embodiments, a call handler in a contact center receiving a particular SIP error code identifies the terminating voice service provider using various means. The call handler may then associate the calling party number used for that call with a status indicator reflecting the terminating voice service provider has blocked the call using that calling party number. The status indicator can indicate that future calls originating with the calling party number will also be blocked by that voice service provider. In one embodiment, the call handler may then select an alternate calling party number value to use on subsequent calls. The call handler may provide appropriate notifications alerting administrators of the condition. Information may be maintained regarding which terminating voice service providers have blocked which calling party numbers, and this information may be used to facilitate redress for allegedly erroneously blocking calls from those numbers.

The subject matter disclosed herein may be implemented as a computer-controlled apparatus, a computer process, a computing system, or as an article of manufacture such as a computer readable storage medium. These and various other features will be apparent from the following Detailed Description and the associated drawings.

This Summary is provided to exemplify concepts at a high level that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
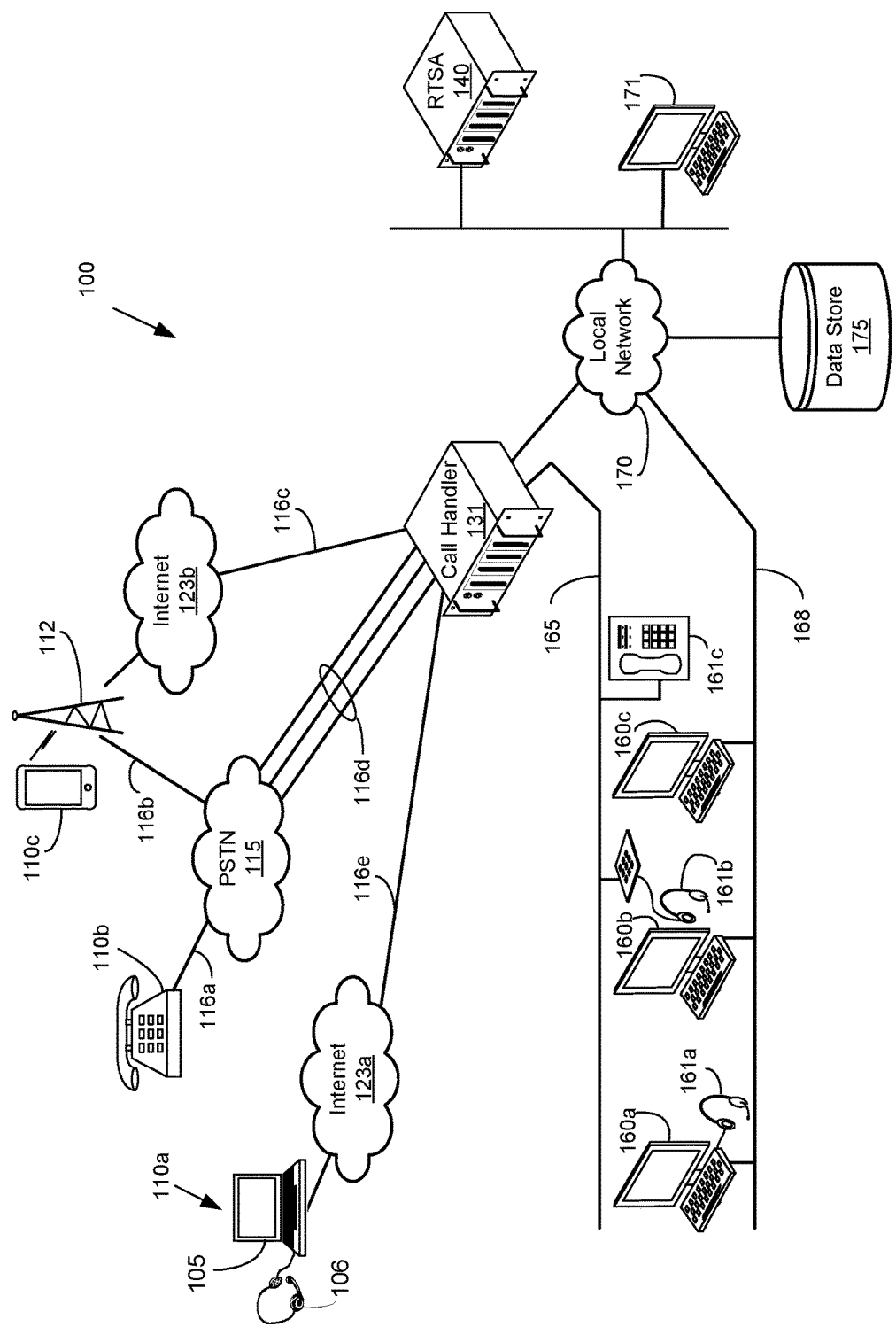
FIG. 1 shows one embodiment of a contact center in which the concepts and technologies herein may be applied to provide for improved call handling treatment by a call handler in a contact center.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout. Embodiments of the invention may be utilized in various industries, as will become apparent to those of ordinary skill in the art as they read the disclosure. However, for purposes of this disclosure, applications involving contact centers are mainly used for illustrating various embodiments of the invention.

Exemplary Contact Center Architecture

FIG. 1 shows one embodiment of a contact center architecture 100 illustrating the various technologies disclosed herein. The contact center shown in FIG. 1 may process voice calls that are inbound-only, outbound-only, or a combination of both (sometimes referred to as a "blended" contact center). Thus, in some instances, the contact center may be referred to as a call center when referring primarily to the context of handling calls. Although many aspects of contact center operation are disclosed in the context of voice calls, in various embodiments, the contact center may process other forms of communication such as, for example, facsimiles, emails, text messages, video calls, and chat messages.

Since the contact center may handle calls originating from a calling party, or initiated to a called party, the term "party" or "remote party" without any further qualification, refers to a person associated with a call processed by the contact center, where the call is either received from or placed to the party. Because call blocking applies to outbound calls originating from the call center, the term "party" will generally refer to a party to whom the contact center is attempting to communicate with via a voice call.

Depending on the embodiment, outbound voice calls may originate to called parties using a variety of different phone types. For instance, a called party may receive a call at a conventional analog telephone 110b connected to a public switched telephone network ("PSTN") 115 using an analog plain old telephone service ("POTS") line 116a. The call may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Outbound voice calls may also originate from the call handler 131 to a smart phone device 110c, such as a smart phone, tablet, or other smart device, which wirelessly communicates with a mobile service provider ("MSP") 112. The voice calls may be routed using the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") from an Internet provider 123b using Internet-based protocols. For convenience, unless indicated otherwise, the term "trunk" refers to any type of facility 116c, 116d, or 116e providing voice calls to, or from, the contact center, regardless of the type of protocol or technology used. Specifically, a "trunk" herein is not limited to time-division multiplexing ("TDM") technology but may encompass VoIP technologies. However, as will be seen, an end-to-end VoIP signaling protocol facilitates the transfer of certain error codes that inform the call handler that the terminating service provider has blocked the calls.

Outbound voice calls may also be directed to a called party employing a so-called "IP phone," "VoIP phone," or "soft phone" 110a. In one embodiment, this device may comprise a computing device 105, such as a laptop, computing tablet, or other electronic device, which interfaces with a headphone/microphone combination, also referred to as a headset 106. The computing device 105 may in turn be connected to an Internet 123a. Those skilled in the art will recognize that a variety of protocols and facilities may be used to convey voice calls.

In various embodiments, outbound calls to called parties may originated from the contact center using a communications handler, and more specifically a call handler 131, which is a computer-based processing system configured to process voice calls, typically using a SIP (session initiated protocol) signaling protocol. The call handler could also incorporate inbound call processing, be, e.g., an automatic call distributor ("ACD"). In particular embodiments, the call handler 131 may be a specialized switch for receiving or originating calls under various conditions. The call handler 131 may route an incoming or outgoing call over contact center facilities 165 to/from an available agent. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the call handler 131.

In various embodiments, calls may be routed over facilities 165 to an agent for servicing. That is, for example, the remote party may speak with an agent for customer service. An agent typically uses a computing device 160a-160c, such as a personal computer, and a voice device 161a-161c. The combination of computing device 160a-160c and voice device 161a-161c may be referred to as a "workstation." In many instances, the computing device handles VoIP so that reference to the "computer workstation" or the "agent's computer" refers to the computer processing device of the workstation, but which may be closely integrated with handling voice as well. Thus, for these particular embodiments, the workstation can be assumed to have at least a data capability and may have a voice capability. Depending on the embodiment, the interaction between the call handler 131 and the agent workstation computers 160a-160c, as well as other components, may involve using a local area network ("LAN") 170.

In some embodiments, the call handler 131 may comprise a dialer, such as a predictive dialer, to originate outbound calls at a rate designed to meet various criteria. In various embodiments, the call handler 131 is typically configured to dial a list of telephone numbers to initiate outbound calls. The list of telephone numbers may be stored in a contact list which is retained in a data store 175. The data store 175 may store other information related to a calling campaign. The calling campaign refers to the logical grouping of outbound calls made for a particular purpose. The data store may store various parameters associated with the calling campaign, including those parameters that define how various options are to function. For example, a calling campaign will maintain data defining how may agents are involved, what contact lists are to be used when dialing, how to treat calls that are not answered, etc. As will be seen, the calling campaign data may also include information as to what calling party telephone number should be used when originating calls for that campaign. Those skilled in the art will recognize that a calling campaign has various parameters that define the campaign.

Finally, the contact center architecture 100 may include incorporate a real-time speech analytics ("RTSA") system 140, which could be bridged onto a call to process audio information in real time. This system could also be a near-real time processing system which rapidly processes a stored audio file. That is, the speech analytics system 140 is provided with audio or an audio file and expected to provide an output of its analysis in near-real time (i.e., on the order of a second or two). The speech analytics system 140 is configured to receive, in some embodiments, two distinct voice streams for a call, so that the speech from the agent is readily distinguished from that of the remote party. The call handler 131 in some embodiments will establish a call leg to the RTSA 140, so that the RTSA may "listen in" to the call, as opposed receiving an audio file. Upon detecting certain indicated words or phrases, the RTSA may generate a message, frequently called an event notification message, to a particular component, such as the call handler 131 that returns the result of the analysis.

An administrator using the administrator workstation 171 may interact with the various components to configure the process, and to define various parameters associated with their operation. For example, the administrator may defined the various campaign parameters necessary to conduct the calling campaign. This data will define, e.g., what contact lists to use, what calling party number values should be used, how dialing is to occur, etc. As shown in FIG. 1, the RTSA 140, the administrator's computer 171, the call handler 131, and the data store 175 may communicate via the LAN 170 between each other.

Although a number of the above entities may be referred to as a "component," each may be also referred to in the art as a "computing device," "unit" or "system." A server may incorporate a local data store and/or interface with an external data store. Use of the word "server" does not require the component to interact in a client-server arrangement with other components, although that may be the case. Further, the above components may be located remotely from (or co-located/integrated with) other components. Furthermore, one or more of the components may be implemented on a single processing device to perform the functions described herein. In addition, the contact center architecture 100 may be provided as a hosted solution, where the call processing functionality is provided as a communication service (a so-called "communication-as—a-service" or "CaaS") to a contact center operator. Thus, there is no requirement that the components identified above must be actually located in a contact center location or controlled by a contact center operator. In addition, depending on the embodiment, the agent positions may be remotely located from the other components of the contact center, sometimes referred to as a "virtual contact center." Those skilled in art will recognize FIG. 1 represents one possible configuration of a contact center architecture 100, and variations are possible with respect to the protocols, facilities, components, technologies, and equipment used.

Campaign Overview

At a high level, a call handler in a contact center originates calls that are associated in some manner with a calling campaign. A calling campaign is typically associated with a list of records (called a "contact list" herein) that are stored in a database, such as data store 175. Typically, each record in the contact list is associated with a called party. For example, a calling campaign may involve providing: product recall notifications to a number of people, notifications of a prescription refills, or requesting participation in a survey. Thus, a calling campaign involves the call handler originating a plurality of calls to various called party numbers, wherein each record in the campaign contact list indicates an account or called party and thier corresponding telephone number. The account information could include other information, such as the called party's name, alternative number, past transactions, etc.

The call handler may use a set of data referred to herein as "campaign calling data" to properly process the call records for the campaign. The campaign calling data defines how various parameters and options are to be configured when originating calls based on the call records. For example, one parameter could indicate a dialing mode (such as predictive dialing or manual dialing), while another parameter indicates what action to take upon encountering an answering machine (hang up or leave a pre-recorded message), etc. To illustrate, a calling campaign to provide prescription refill notifications may play a particular recorded message if the call is answered (regardless of whether it is answered by a live person or answering machine). On the other hand, a calling campaign to provide medical test results may be configured to connect the answering party with an agent (assuming a person answers the call), but if an answering machine answers, then the dialer may play a message requesting the called party to callback at their convenience.

One campaign calling data parameter may also indicate the calling party telephone number, also referred to herein as the "ANI" (for "automatic number identification"), to be used when originating the call. Obviously, in the above example, a prescription refill campaign would use a calling party number associated with the pharmacy whereas the medical test notification campaign may use calling party number associated with a doctor' office or hospital. The campaign parameter set may have a set of ANI values indicated in a list (called the "ANI Origination List" or simply "ANI List" herein), which are to be used when selecting a value therefrom for originating calls. In one embodiment, the first ANI value in the ANI list is to be used, unless a flag associated with that ANI indicates otherwise. The flag can be thought of as a blocking status flag that reflects whether a carrier has blocked a call using that ANI. Once an ANI is informed that a call with that ANI has been blocked, the call handler will select the next ANI value in the ANI list for originating outbound calls for that campaign. If there are no more ANI values in the ANI list, i.e., all values have been flagged or have a status indicating they were blocked, then in one embodiment the calling campaign terminates and an appropriate notification is issued to an administrator. It is possible that multiple campaigns could share a common ANI list.

System Architecture

Figure 2:
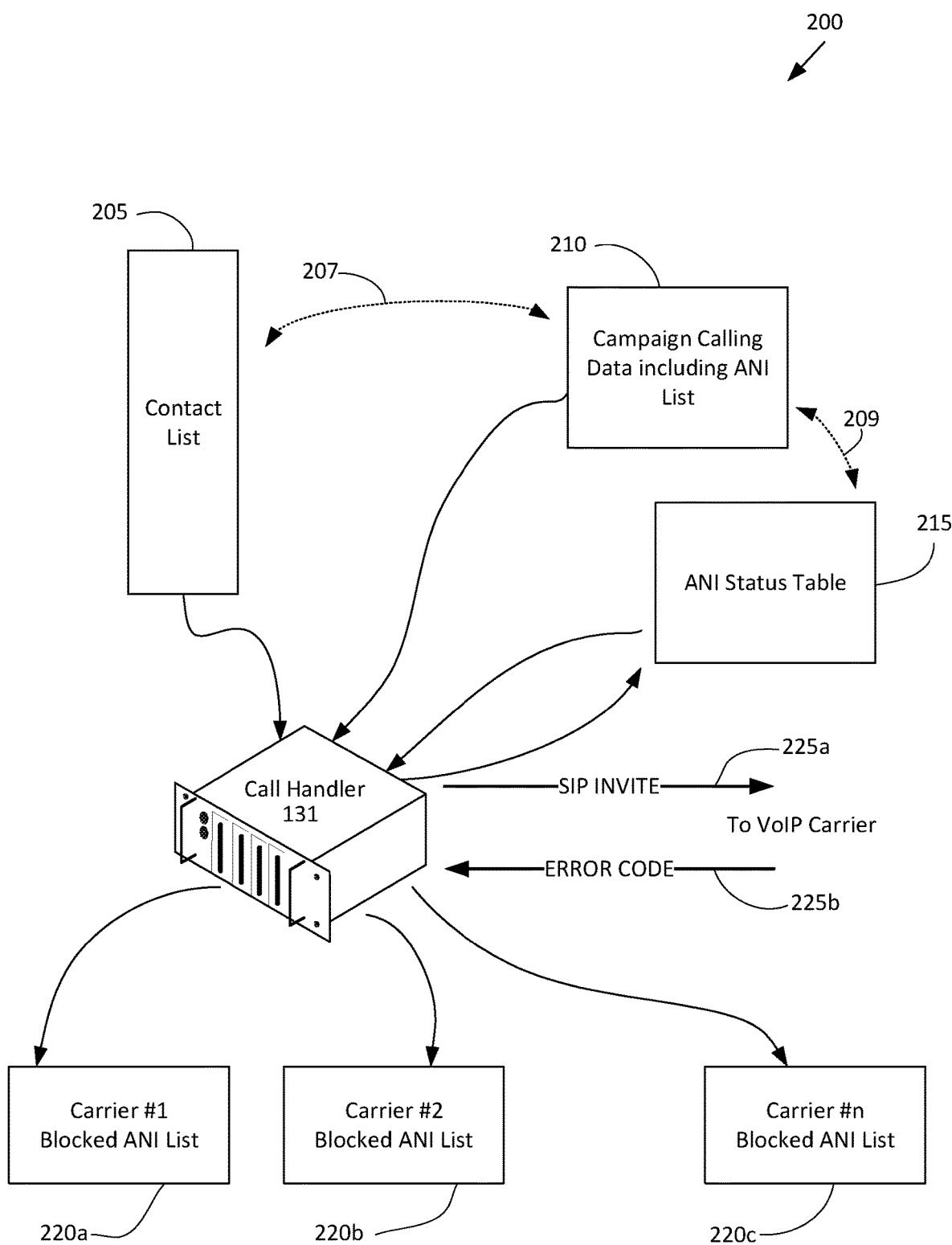
FIG. 2 shows one embodiment of high level aspects associated with a call handler processing blocked calls in a contact center.

Turning to FIG. 2, one embodiment of a high level system architecture is shown. In this embodiment, a main component is the call handler 131 which originates calls to a VoIP carrier. There are a variety of VoIP protocols that can be used to establish a voice channel between the call handler and the VoIP service provider or carrier. These protocols include the H.323 standard, the Media Gateway Control Protocol, the H.248 standard, and the Real-Time Transport Protocol ("RTP"). While the principles disclosed herein could be adapted for using these protocols, the concepts and technologies herein are adapted to a specific VoIP protocol, namely the Session Initiation Protocol ("SIP") developed by the Internet Engineering Task Force ("IETF").

Prior to originating calls, certain data structures associated with the calling campaign must be established and retrieved for use by the call handler. There must be a contact list 205 defined which is a list of account records that includes the called party number. The call handler 131 ingests the contact list (or portions thereof periodically) prior to originating calls. The contact list 205 is associated with a set of campaign calling data 210 as reflected by line 207. The set of campaign calling data includes a list ANI values (calling party telephone numbers) to use when originating the outbound calls—the ANI List. Further, each value in the ANI list is associated with a status indication, which may be maintained in the ANI Status Table 215. In other embodiments, the ANI status table 215 may be integrated with the campaign calling data 210. In either embodiment, the ANI List or the campaign calling data may maintain an explicit or implicit indication of which number in the ANI List is the value to be currently used for originating calls and its status. This can be an explicit pointer or implied via the order of the list. In other embodiments, a separate flag value could also be used to reflect whether a value has been used, is being used, or may be used. If a number's status reflects that it has been blocked by a terminating voice service provider, then that number should not be used for originating calls. Thus, the currently used ANI value is presumed to have a status reflecting that it has not been blocked by a carrier. Once that number is blocked, its status is updated and it should not be used for originating calls.

The call handler ingests all or a part of the contact list 205 prior to dialing, along with the ANI value to use from the campaign calling data 210. The ANI Status Table 215 may be accessed by the call handler to confirm that the ANI value to be used has not been flagged as having been blocked by a carrier.

The line 209 reflects the linkage between the campaign calling data 210 and the ANI status table 215. A calling campaign can be considered as being defined by the collection of data (contact list 205, campaign calling data 210, and ANI status table 215, and other related data). Thus, the collection of data defines how the calls are processed.

The call handler then originates a VoIP call by generating a SIP INVITE message 225a to the VoIP carrier. This SIP signaling should conform to the various well known standards for originating a SIP call as defined by the Internet Engineering Task Force ("IETF"). The INVITE message will include information indicating the called party number as well as the calling party telephone number (referenced as the ANI herein). This INVITE message will be routed to the terminating voice service provider that is serving the called party. That carrier may then apply analytics or other technologies to block that particular call based on part on the particular ANI present.

If the call is not blocked, then the SIP call may be answered and processed according to well-known call processing procedures. In other cases, the SIP call may be blocked, in which case the terminating voice service provider does not alert the called party, and may instead route the call to an audio intercept system and play the caller an announcement. Intercepts are audio messages provided by the voice service provider which convey information to the caller, typically as to why the call could not be completed. After the intercept is played once or twice, the terminating voice service provider will then return a SIP error code as represented by lines 225b. This is presumed to be a code value that explicitly indicates that the call was blocked by the service provider. Further, in various embodiments, the error code may also convey information about the service provider that blocked the call. In one embodiment, a "vCard" (a.k.a. virtual contact file or VCF) is included that has one or more channels indicated for contacting the service provider.

The vCard is a standard format for conveying information found on a business card. See, e.g., IETF Request for Comments ("RFC") 6350, the contents of which are incorporated by reference. The information may comprise the name (in this case, it would be of the service provider), a telephone contact (of the service provider), and other information (including other addresses for other channels for contacting the service provider). Based on this information, the call handler 131 is able to ascertain the identity of the carrier blocking the call. Recall that the terminating voice service provider is responsible for terminating the call to the called party, as indicated by the called party number. Thus, each called party number will be associated with a particular service provider, whether it be VoIP service provider, a telco, wireless provider, etc. However, providing a SIP error code and/or the vCard to the call handler presumes there is an end-to-end SIP call, or at least appropriate interworking between the originating and terminating service providers.

Upon receipt of the SIP error code with an appropriate value, the call handler knows that the ANI has been blocked by the terminating carrier, and the call handler in response can now flag that ANI in the ANI status table 215 as having been blocked. The call handler may ascertain the carrier either from the vCard in the SIP error code, or other means, including via speech analysis of the audio intercept, which may indicate a customer service number of the carrier. Once the carrier has been identified, then that ANI can be listed in a carrier table 220a-220c that indicates which carriers have blocked which ANIs. Other data structures could be used, but these are illustrated as separate carrier tables, which facilitates communicating the numbers that were blocked to the appropriate service provider. Other structures could be used, such as lists or arrays for storing the data.

The ANI List 215 may have numerous values, i.e., beyond just one or two values. There may be dozens or hundreds of ANIs that may be used in a calling campaign. Once an ANI is blocked and then flagged by the call handler as having been blocked, then that number is no longer used for call origination. That number may be retired indefinitely, or until informed otherwise, or for a pre-determined time period.

At some subsequent point, the call center administrator will attempt to address the blocking of the ANI numbers for that calling campaign with the appropriate carrier, so that calls using those values are no longer blocked. Various means may be used to mitigate the blocking of calls by the carrier. This may involve various procedures such as contacting the carrier and registering the number(s) which were blocked or otherwise requesting that the calls using the ANI are not longer blocked. Once it is confirmed the carrier will not block that ANI, then the flag for the ANI is reset in the campaign calling data and that number may be put back into use. This may occur while the campaign is executing or during a break in the execution of the calling campaign. For example, many campaigns may last for several weeks or indefinitely, with the campaign suspended at the end of each day and resuming the following day. Thus, the ANI flag could be reset after a particular day's campaign execution. Once reset, then the call handler can then use that ANI for originating calls.

There are various combinations of how the SIP error code and the intercept announcement are provided by the terminating voice service provider. First, the terminating service provider may opt to provide a SIP error code only, without first providing an audio intercept. Presumably, the error code would unambiguously indicate that the call was blocked by the terminating service provider. If the error code is ambiguous, then the call handler cannot clearly determine whether the call was blocked or otherwise could not be completed. Second, the terminating service provider may opt to provide both: a SIP error coder reflecting the call has been blocked and an intercept announcement indicating the same. Third, the service provider may provide the intercept announcement but no SIP error code, but a response code (i.e., the SIP code would reflect an inaccurate value, such as 200—"OK"). A SIP error code can be viewed as a particular subset of the allowable values of the SIP response code.

In the first case, there is no intercept and thus reliance is wholly on the SIP error code to determine the call was blocked. In the second case, there is both the SIP error code and the intercept, and they should be consistent (i.e., there is not ambiguity). In the third case, there is an intercept, and a SIP response code, where the response code does not reflect any abnormal condition or is not consistent with the semantics of the intercept message. If there is both a SIP response code and an intercept, then precedence should be given to the response that is definitive. That is, if the intercept indicates the call was blocked by the service provider, or the SIP error code indicated unambiguously the call was blocked by the service provider, then it can be concluded the call was blocked even if the other indication is inconsistent.

Figure 3A:
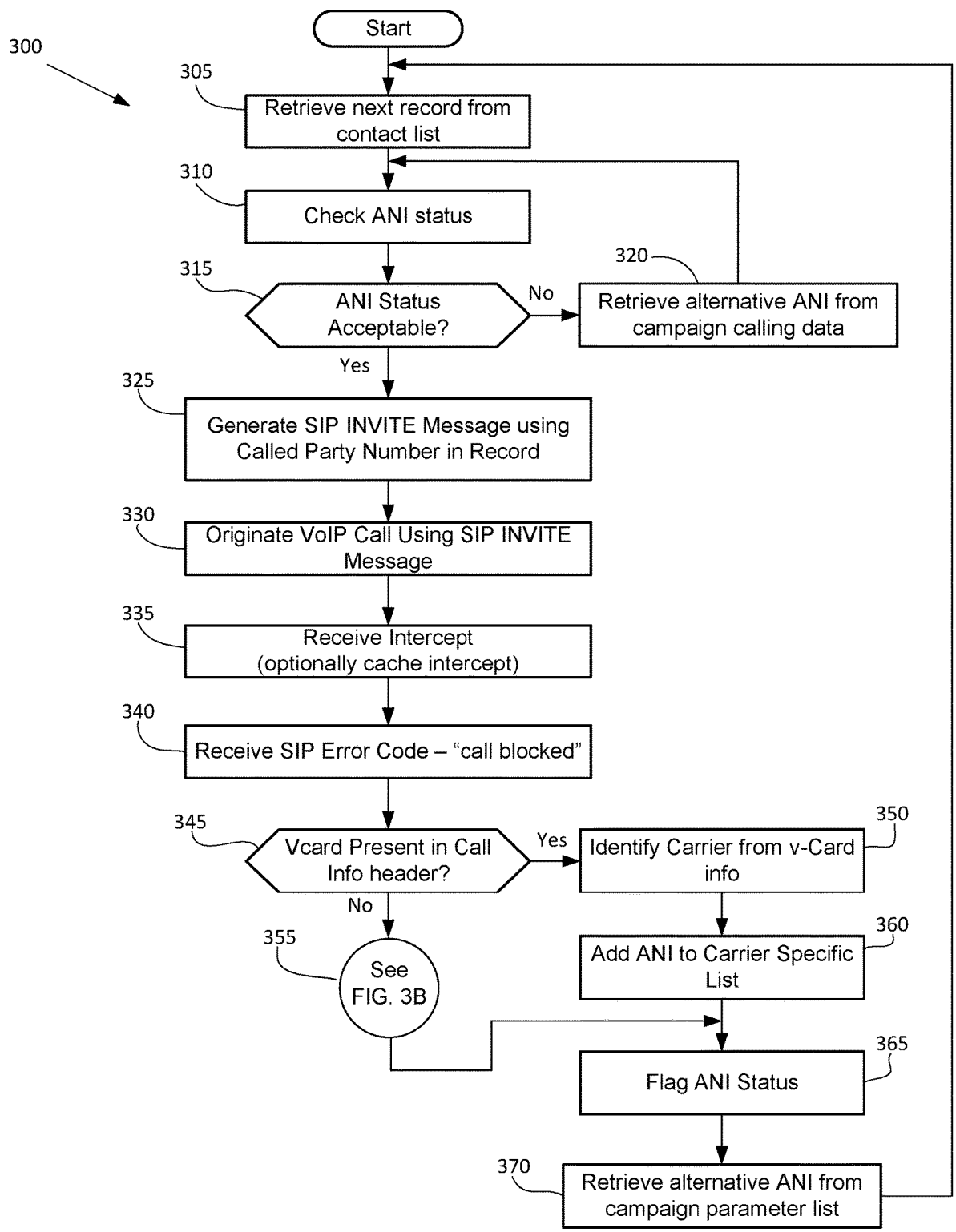
FIGS. 3A-3B shows one embodiment of a high level process flow of a call handler in processing a SIP call that is blocked.

Turning now to FIG. 3A, one embodiment of the process flow executed in a call handler is shown. The process 300 is predicated on the contact list 205, the campaign calling data 210, and the ANI status table 215 accessible to the call handler 131. That is, the contents may be loaded into memory in the call handler, or readily accessible if stored externally to the call handler. In various embodiments, this information may be stored in the data store 175 of FIG. 1 and loaded into the call handler at the beginning of the calling campaign.

The process 300 begins with the call handler retrieving the initial (or next) record from the contact list in operation 305. In various embodiments, records may be retrieved individually, or in groups of a few dozen records at a time (rather than one at a time). Next, the call handler checks to see for a given record whether the ANI that is to be used (based on the campaign calling data) has a flagged status as indicated in the ANI status table in operations 310 and 315.

If the ANI has been flagged as being blocked, then the ANI should not be used. Rather, an alternative ANI from the campaign calling data should be retrieved in operation 320. This may be the next ANI in a list, a random value selected from the list that has not been flagged, or a value selected based on some other algorithm. The process then returns to process 310. (In other embodiments, the process may continue to operation 325 since it is known that the ANI status for the number just selected is acceptable.) In essence, once the ANI selected is flagged as having been blocked, the call handler to cease using it.

If the status of the ANI is such that it was not flagged in operation 315, then the call handler then generates a SIP INVITE message for originating a VoIP call using procedures known to those skilled in the art in operation 325. In one embodiment, the SIP INVITE message conforms to the Internet Engineering Task Force ("IETF") recommendations, such those found in RFC 3621. The INVITE message conveys a request for initiating a voice call and includes the called party number derived from the selected record in the contact list. The selected ANI from the campaign calling data is used as the calling party number. The VoIP call is initiated using the SIP INVITE message in operation 330. This is transmitted to a VoIP carrier, which can be wireline or wireless based.

If the call is not blocked, then the message flow will be reflected according to processes known in the art, and a two-way audio connection will be established between the call handler and the called party. However, this process 300 illustrates the call flow where the outcome is such that the terminating carrier does block the call. The terminating carrier may provide an audio intercept in operation 325. The audio intercept is a short audio message understandable to humans, indicating a reason why the call could not be completed. Many are familiar with receiving existing audio intercept messages, such as along the lines of "the number you have dialed is no longer in service." However, in this case, the intercept message may state: "the terminating carrier has blocked this call from completing to the called party. If you think this is in error, please contact the terminating carrier at this number: [toll free telephone number]."

The audio intercept may be repeated once and may then be followed by a SIP error code which indicates the call has been blocked in operation 340. In one proposed embodiment, the SIP error code has a value of 608 ("rejected"). This code reflects that the terminating network blocked the code, not the called party. Using existing error code values reflecting the called party rejected the call are inappropriate, since the called party must be first offered the call to reject it. Hence, that does not comport with the terminating service provider blocking the call.

The SIP error code is a digital message defined in the SIP signaling framework which is readily understood by the call handler, whereas the audio intercept is readily understood by a human. One such proposal of an error code is described in a submission to the IETF entitled: "*A Session Initiation Protocol (SIP) Response Code for Rejected Calls*", submitted by E. W. Burger.

Including both an audio intercept and SIP error code by the terminating carrier ensures that either a human or automated dialer can understand that the call was blocked. The blocking carrier will not necessarily know whether a human or automated dialer initiated the call, and hence cannot selectively provide one form in lieu of the other. Thus, it is preferable that the terminating carrier provides both forms.

In some embodiments, the message conveying the error code may also convey information for contacting or identifying the terminating carrier blocking the call. In one embodiment, a vCard (also known as a virtual contact file or electronic business card) may be included in the SIP error message, indicating one of a name, telephone number, address, website, email address, or other channel for contacting the terminating carrier. For example, in one embodiment, the information could be structured as defined in IETF Draft Standard dated Jul. 23, 2018, entitled "*A Session Initiation Protocol (SIP) Response Code for Rejected Calls draft-burger-sipcore-rejected*-01."

If a vCard or other form of identification is included, then the carrier may be identified directly by the call handler from that information in operation 350. Once the carrier is identified, then the ANI of that outgoing call is associated with that carrier, which may involve adding the ANI to a carrier table comprising other numbers that the carrier is blocking in operation 360. This allows the call handler to maintain all the numbers that the carrier is currently blocking. This can be used to facilitate redress or mitigation requests for erroneously blocked calls. Next, the call handler will flag that ANI in the ANI status table in operation 365. That informs the call handler that a terminating carrier is blocking that ANI and it should not be used in originating calls, or at least in originating calls to the particular carrier that blocked it. These actions could occur in reverse order.

At this point, the call handler should retrieve an alternative ANI from the campaign calling data to use in originating calls. That ANI that is selected should not be flagged. If it is flagged, then another value should be selected. If there are no further unflagged ANIs available, then the process should terminate and the administrator is informed (this is not shown in FIG. 3A.) Otherwise, the process returns to operation 305 where the next record from the contact list is retrieved and the process repeats until the last record in the list is called.

If the vCard or other similar information is included in the SIP error message in operation 345, then the identity of the carrier can be quickly ascertained. However, in some instances it may not be included. In this case, the process continues to operation 355, which is found in detail in FIG. 3B. There are different ways in which the blocking carrier may be identified by the call handler, including by processing the audio intercept.

Figure 3B:
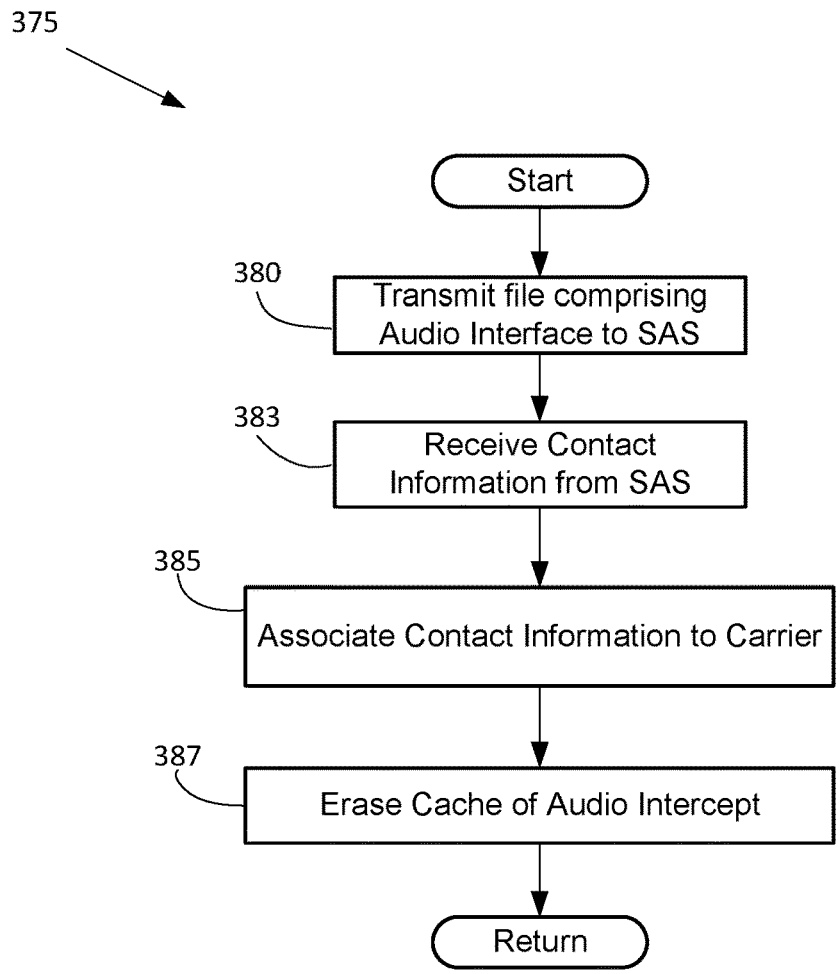

Turning to FIG. 3B, an alternate approach for identifying the carrier is shown. This process presumes that when the audio intercept is provided to the call handler, that the call handler caches the audio in an audio file format in memory (using any of the well-known audio known formats). The audio may be erased as it is unneeded if a SIP error code message is provided and indicates the terminating carrier blocking the call. Otherwise, the call handler transmits the audio file comprising the intercept to a real-time speech analytics system in operation 380. This is typically done as soon as the call handler ascertains the SIP error code message does not identify the carrier explicitly. The speech analytics system processes the audio in the intercept and ascertains the terminating carrier provided the intercept. One approach is to analyze the audio for a contact telephone number and map that telephone number to a list of known customer service numbers of known carriers. Thus, if for example, the intercept announcement informs the caller that redress for erroneously blocked calls can be obtained by calling "1-800-555-1212" then the speech analytics system can use a table of customer service numbers to find out which carrier is using that number. In various embodiments, the mapping of the telephone number to identify the carrier may be done by the speech analytics system or the call handler. Further, each carrier is expected to use their own same unique audio intercept, so that once that audio signature is known, the speech analytics system can ascertain the carrier by the audio intercept, even if a number is not indicated in the audio intercept.

In FIG. 3B, the embodiment is illustrated where the speech analytics system returns the telephone contact information to the call handler in operation 383, and the call handler ascertains the carrier in operation 385. At this point, the call handler can erase the audio intercept in operation 387. Once the carrier is identified, then the contact information is provided by the speech analytics system to the call handler in operation 383. Alternatively, the speech analytics system could ascertain the carrier based on other aspects of the audio intercept and return the carrier identification to the call handler.

In the above embodiment, the call handler caches the audio intercept and provides it as an audio file to the speech analytics system for analysis shortly after the call ends. In another embodiment, the call handler could have bridged on the speech analytics system for analysis as the call is being established. Specifically, the call handler could bridge on the audio channel from the remote party to the speech analytics system, allowing it to also receive the audio intercept, which it can process in real time. This would avoid the call handler from caching the audio intercept. Then, after analysis of the audio intercept, the speech analytics system could return information to the call handler. The information could be identification of the carrier, or providing information uniquely associated with the carrier (such as the toll free telephone number indicated in the audio intercept) which the call handler uses to then identify the carrier. Either sending the audio file or bridging on the speech analytics system are alternative embodiments of determining the identify of the terminating carrier by analyzing the audio intercept.

Another embodiment of determining the terminating service provider can be done by querying a database, such as the LERG (Local Exchange Routing Guide) which indicates for a given telephone number the carrier assigned that value. Either the LERG or some other database service can be queried based on providing the called party number. This avoids having to analyze the audio intercept, and can be done as the call is in progress or shortly afterwards.

Reporting of Blocked ANI Values

The call handler originates calls for a given campaign as long as there are available ANI values that are not flagged as having been blocked by a carrier. As numbers are added to the carrier-specific tables 220a-220c of FIG. 2, the administrator may desire to review these tables. At various times, the administrator may attempt to seek some form of redress or mitigation with each of the identified carriers. This should happen before the list of ANIs are all flagged. Redress for erroneous blocking may be accomplished by contacting each respective carrier and informing them of the ANI values which were blocked. This can be done by providing the corresponding carrier table of blocked ANI values. The carrier may also request other information, such as when the call occurred. This information may be also stored in the various carrier tables 220a-220c if deemed necessary.

The carrier blocking the call may offer a customer service channel for receiving redress requests. This could be telephone, web access, or some other means. As part of this process, the carrier may have to verify that the entity requesting the ANI values be unblocked is the authorized user of those numbers. The carrier may confirm that the numbers will not be blocked by adjusting their proprietary algorithms to avoid blocking those indicated numbers. The carrier may provide a notification or provide other means of informing the contact center when the numbers are no longer flagged for blocking. Once the administrator is aware of the change in status, then the administrator can reflect the change in the ANI Status table 215 of FIG. 2 using the administrator's workstation 171 of FIG. 1 or some other means can be used to automatically update the ANI Status table.

Exception Use Cases

The presence of a SIP error code that is defined to convey call blocking by the terminating voice service provider should be unambiguous. However, it is possible that terminating service providers may provide inconsistent information. It is quite possible that the terminating service provider will provide an audio intercept that is unambiguous and states the call has been blocked by the terminating service provider, but the SIP error code is inconsistent. For example, any of the 4XX series of error codes, which are client failure responses are not appropriate to reflect network blocking. Further, many of the 5XX series of error codes may be used by the terminating service provider, which are also inconsistent with network blocking of the call. For example, rather than upgrade equipment to use a newly defined code (i.e., 608), the carrier may rely on equipment that is using an existing code (e.g., 503 service unavailable) that is not accurate. Other codes, in the 6XX series for global failure responses may not be appropriate. For example, error code 607 (unwanted) presumes the called party was aware of the call, which implies the call was not blocked, but offered, and then the called party rejected the call as unwanted.

This results in a situation where slightly different outcomes are reported by the audio intercept and the error code. In one embodiment, where the call handler receives conflicting information from the SIP error code and from a speech analytics system, the information from the speech analytic system is presumed accurate. On the other hand, if the SIP error code is of a value unambiguously allocated to call blocking, then the call handler can presume it is accurate and may ignore or skip the audio processing of the audio intercept. Consequently, in some embodiments the call handler may flag an ANI number as being blocked, when the SIP error code does not indicate such, but a speech analytics system has unambiguously determined the call was blocked. Because each voice service provider is expected to each use a uniform audio intercept when blocking a call, it is possible to unambiguously identify that carrier's intercept when a call is being blocked, even if that carrier uses an inconsistent SIP error code in its response.

Exemplary Computer Processing System

Figure 4:
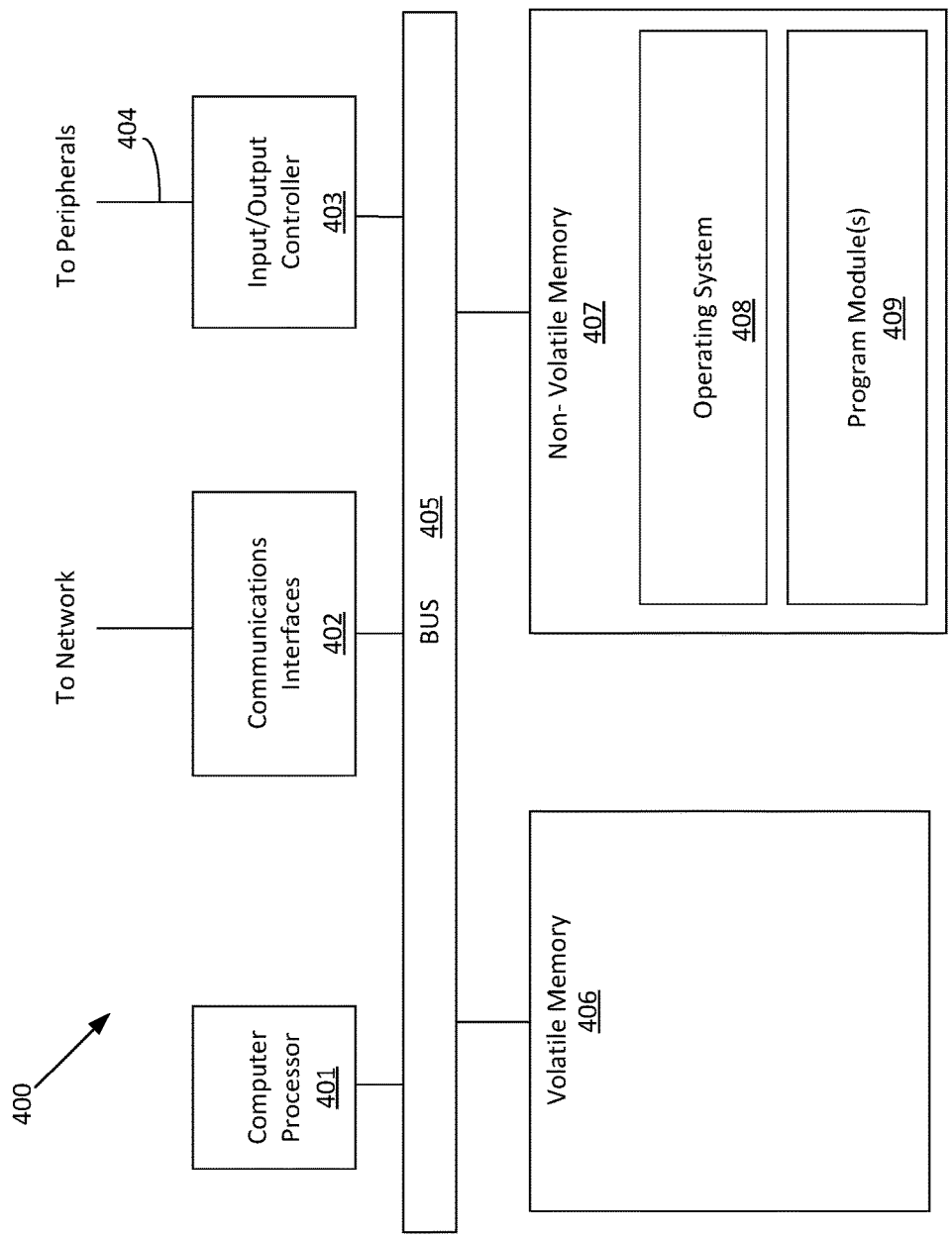
FIG. 4 discloses one embodiment of an architecture of a computer processing component in a contact center for practicing the concepts and technologies disclosed herein.

As discussed in conjunction with FIG. 1, the contact center architecture 100 may comprise various components. Accordingly, FIG. 4 is an exemplary schematic diagram of a computer processing component 400 that may be used in various embodiments of the contact center architecture 100 to practice the technologies disclosed herein such as, for example, the communications handler 131. In general, the term "computer processing component" may be exemplified by, for example, but without limitation: a various types of computers, servers, blades, gateways, switches, and the like, as well as any combination of devices or entities adapted to perform the functions described herein.

As shown in FIG. 4, the computer processing component 400 may include one or more computer processors 401 that may communicate with other elements within the computer processing component 400 via a bus 405. The computer processor 401 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the computer processing component 400 may also include one or more communication interfaces 402 for communicating data via the local network with various external devices, such as other components of FIG. 1. Depending on the embodiment, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The computer processing component 400 may further include an input/output controller 403 that may communicate with one or more input devices or peripherals using an interface 404, such as, but not limited to: a keyboard, a mouse, a touch screen/display input, microphone, pointing device, etc. The input/output controller 403 may also communicate with output devices or peripherals, such as displays, printers, speakers, headsets, banner displays, etc.

The computer processor 401 may be configured to execute instructions stored in volatile memory 406, non-volatile memory 407, or other forms of computer-readable storage media accessible to the processor 401. The volatile memory 406 may comprise various types of memory technologies, including, but not limited to: random access memory ("RAM"), dynamic random access memory ("DRAM"), static random access memory ("SRAM"), and other forms well known to those skilled in the art. The non-volatile memory 407 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 407 may store program code and data, which also may be loaded into the volatile memory 406 at execution time. Specifically, the non-volatile memory 407 may store one or more program modules 409, containing instructions for performing the processes and/or functions associated with the technologies disclosed herein, and/or operating system code 408. In addition, these program modules 409 may also access, generate, or store data 410, in the non-volatile memory 407, as well as in the volatile memory 406. The volatile memory 406 and/or non-volatile memory 407 may be used to store other information including, but not limited to: records, applications, programs, scripts, source code, object code, byte code, compiled code, interpreted code, machine code, executable instructions, or the like. These may be executed or processed by, for example, the processor 401 and/or may form a part of, or may interact with, the program modules 409.

The technologies described herein may be implemented in various ways, including as computer program products comprising memory storing instructions causing a computer processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

The system disclosed herein offers various practical benefits for call center operators. A call handler that is unable to determine when a call is blocked may retain that number in the various contact lists, and continuously attempt to reach that number. However, it can be expected that each of these attempts will be unsuccessful, as the call will be blocked by the terminating service provider, and the called party may not be aware that an attempt was made to contact the called party.

In various applications, a contact center may be required to contact the called party before proceeding with certain actions. Or, a contact center may be limited in how frequently they can contact a called party. There are various regulations in the mortgage and debt collection industries that govern the minimum or maximum number of call attempts that may occur. If the contact center is originating calls, which it considers as a call attempt, but the call was never offered to the called party, it is evident that the caller will have an inaccurate view of the situation.

Furthermore, expending resources in an attempt to reach a called party, but when the call is blocked by the terminating carrier, is inefficient and costly. The call handler can be better configured to maximize use of its resources, rather than repeatedly attempting to originate calls that will be blocked. Further, accurately and unambiguously logging which calls were blocked (by noting the called party and calling party number) facilitates seeking mitigation with a carrier. Thus, various aspects of the claimed invention present many practical benefits for contact center operators by having call handler accurately process a SIP error code and/or intercept indicating the call was blocked.

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A call handler configured to:
retrieve a plurality of records from a contact list, wherein each record comprises a respective called party number used to originate a respective call of a calling campaign;
maintain campaign call data in a memory, the campaign call data comprising a set of calling party telephone numbers to be used when originating calls of the calling campaign;
maintain a status table in the memory associating a status of each calling party telephone number in the set of calling party telephone numbers, where the status of a respective calling party telephone number is changed in response to detecting the respective call originated using the respective calling party number is reported as blocked via a SIP error code;
retrieve a first record of the plurality of records from the contact list comprising a first called party number;
originate a first call by transmitting a session initiated protocol ("SIP") INVITE message to a voice over IP ("VoIP") carrier, the SIP INVITE message indicating the first called party number and a first calling party telephone number selected from the set of calling party telephone numbers;
receive the SIP error code after originating the first call, wherein the SIP error code indicates the first call was blocked by a terminating voice service provider;
modify a status of the first calling party telephone number in the status table in the memory in response to receiving the SIP error code;
retrieve a second calling party telephone number from the campaign call data, wherein a status of the second calling party telephone number does not reflect having been blocked; and
use the second calling party telephone number to originate a second call to a second called party number using a second record from the contact list.

2. The call handler of claim 1, wherein the call handler is further configured to:
receive an audio intercept announcement after originating the first call and before receiving the SIP error code, wherein the audio intercept announcement conveys to a listener that the first call was blocked by the terminating VoIP service provider.

3. The call handler of claim 1, wherein the call handler is further configured to:
ascertain the terminating VoIP service provider by using information conveyed in the SIP error code.

4. The call handler of claim 3, wherein the call handler is further configured to:
receive along with the SIP error code a virtual contact file ("vCard") comprising information used to ascertain the terminating VoIP service provider.

5. The call handler of claim 1, wherein the call handler is further configured to:
flag the first calling party number as a current calling party number prior to receiving the SIP error code; and
reset the flag of the first calling party number as the current calling party number and flag the second calling party number as the current calling party number after receiving the SIP error code.

6. The call handler of claim 1, wherein the call handler is further configured to:
receive information from a speech analytics system analyzing an audio intercept announcement to identify the terminating VoIP service provider.

7. The call handler of claim 1, wherein a carrier table is maintained in the memory identifying the terminating VoIP service provider and lists the first calling party telephone number, and wherein the first calling party telephone number is added to the carrier table in response to receiving the SIP error code.

8. The call handler of claim 1, wherein the value of the SIP error code is 608.

9. A non-transitory computer readable medium storing instructions that when executed cause one or more computer processors to:

17 retrieve a plurality of records from a contact list, wherein each record comprises a respective called party number used to originate a respective call of a calling campaign;

maintain campaign call data in a memory comprising a set of calling party telephone numbers to be used when originating calls of the calling campaign;

maintain a status table in the memory associating a status of each calling party telephone number in the set of calling party telephone numbers, where the status of a respective calling party telephone number is changed in response to detecting a respective call originated using the respective calling party number is reported as blocked using a SIP error code;

retrieve a first record of the plurality of records from the contact list comprising a first called party number;

originate a first call by transmitting a session initiated protocol ("SIP") INVITE message to a voice over IP ("VoIP") carrier, the SIP INVITE message indicating the first called party number and a first calling party telephone number, wherein the first calling party telephone number is in the set of calling party telephone numbers;

receive the SIP error code after originating the first call, wherein the SIP error code indicates the first call was blocked by a terminating VoIP provider;

modify a status of the first calling party telephone number in the status table in the memory in response to receiving the SIP error code;

retrieve a second calling party telephone number from the campaign call data, wherein a status of the second calling party telephone number does not reflect having been blocked; and use the second calling party telephone number to originate a second call to a second called party number using a second record from the contact list.

10. The non-transitory computer readable medium of claim 9, wherein the instructions when executed further cause the computer processor to:

receive an audio intercept announcement after originating the first call and before receiving the SIP error cord, wherein the audio intercept announcement conveys to a listener that the first call was blocked by the terminating VoIP service provider.

11. The non-transitory computer readable medium of claim 9, wherein the instructions when executed further cause the computer processor to:

ascertain the terminating VoIP service provider by using information conveyed in the SIP error code.

12. The non-transitory computer readable medium of claim 11, wherein the instructions when executed further cause the computer processor to:

receive with the SIP error code a virtual contact file ("vCard") conveying the information identifying the terminating VoIP service provider.

13. The non-transitory computer readable medium of claim 9, wherein the instructions when executed further cause the computer processor to:

indicate the second calling party telephone number in the status table as a current calling party telephone number after receiving the SIP error code.

14. The non-transitory computer readable medium of claim 9, wherein the instructions when executed further cause the computer processor to:

18 receive information from a speech analytics system identifying the terminating VoIP service provider by analyzing the audio intercept.

15. The non-transitory computer readable medium of claim 9, wherein the instructions when executed further cause the computer processor to:

maintain a carrier table in the memory associating the terminating VoIP service provider and the first calling party telephone number, wherein the first calling party telephone number is added to the carrier table in response to receiving the SIP error code.

16. The non-transitory computer readable medium of claim 9, wherein the value of the SIP error code is 608.

17. A method for originating calls by a call handler comprising:

retrieving a plurality of records from a contact list by the call handler, wherein each record comprises a respective called party number used to originate a respective call in a calling campaign;

storing in a memory campaign call data comprising a set of calling party telephone numbers to be used when originating the call of the calling campaign;

storing a status table in the memory associating a status of each calling party telephone number in the set of calling party telephone numbers, where the status of a respective calling party telephone number is changed in response to detecting the respective call originated using the respective called party number is indicated as blocked via a SIP error code;

retrieving a first record of the plurality of records from the contact list comprising a first called party number;

originating a first call by transmitting a session initiated protocol ("SIP") INVITE message to a voice over IP ("VoIP") carrier, the SIP INVITE message indicating the first called party number and a first calling party telephone number selected from the set of calling party telephone numbers;

receiving a SIP error code after originating the first call, wherein the SIP error code indicates the first call was blocked by a terminating VoIP service provider;

modifying a status of the first calling party telephone number in the status table in the memory in response to receiving the SIP error code;

retrieving a second calling party telephone number from the campaign call data, wherein a status of the second calling party telephone number does not reflect having been blocked; and using the second calling party telephone number to originate a second call to a second called party number using a second record from the contact list.

18. The method of claim 17, further comprising:

receiving an audio intercept announcement after originating the first call and before receiving the SIP error cord, wherein the audio intercept announcement conveys to a listener that the first call was blocked by the terminating VoIP service provider.

19. The method of claim 18, wherein the SIP error code is a value of 608.

20. The method of claim 17, wherein the SIP error code is in a message further comprising a virtual contact file ("vCard").

* * * * *